United States Patent
Bellamy et al.

(10) Patent No.: US 7,917,544 B2
(45) Date of Patent: Mar. 29, 2011

(54) METHOD AND APPARATUS FOR RETRIEVING DATA REPRESENTING A POSTAL ADDRESS FROM A PLURALITY OF POSTAL ADDRESSES

(75) Inventors: David John Bellamy, London (GB); David Richard Ranson, London (GB)

(73) Assignee: QAS Limited

( * ) Notice: Subject to any disclaimer, the term of this patent is extended or adjusted under 35 U.S.C. 154(b) by 0 days.

(21) Appl. No.: 12/754,547

(22) Filed: Apr. 5, 2010

(65) Prior Publication Data

US 2010/0198851 A1    Aug. 5, 2010

Related U.S. Application Data

(63) Continuation of application No. 12/111,002, filed on Apr. 28, 2008, now Pat. No. 7,693,853, which is a continuation of application No. 11/103,306, filed on Apr. 11, 2005, now Pat. No. 7,366,726, which is a continuation of application No. 09/976,399, filed on Oct. 12, 2001, now Pat. No. 6,879,983.

(30) Foreign Application Priority Data

Oct. 12, 2000   (GB) .................................. 0025042.3

(51) Int. Cl.
   *G06F 17/30*   (2006.01)
(52) U.S. Cl. ...................................... 707/802; 382/102
(58) Field of Classification Search .................. 707/802, 707/999.1; 382/101, 102
See application file for complete search history.

(56) References Cited

U.S. PATENT DOCUMENTS

| | | | |
|---|---|---|---|
| 4,868,570 A * | 9/1989 | Davis | 341/106 |
| 5,121,484 A | 6/1992 | Hirami et al. | |
| 5,146,403 A | 9/1992 | Goodman | |
| 5,422,821 A | 6/1995 | Allen et al. | |
| 5,659,731 A | 8/1997 | Gustafson | |
| 5,703,783 A | 12/1997 | Allen et al. | |
| 5,734,568 A * | 3/1998 | Borgendale et al. | 700/224 |
| 5,781,634 A | 7/1998 | Cordery et al. | |
| 5,805,710 A * | 9/1998 | Higgins et al. | 382/101 |
| 5,881,131 A | 3/1999 | Farris et al. | |
| 5,944,787 A * | 8/1999 | Zoken | 709/206 |
| 6,121,901 A * | 9/2000 | Welch et al. | 341/51 |
| 6,144,988 A | 11/2000 | Kappel | |
| 6,233,523 B1 * | 5/2001 | Sood | 701/213 |

(Continued)

FOREIGN PATENT DOCUMENTS

EP     0 351 871 A     1/1990

(Continued)

*Primary Examiner* — Cheryl Lewis
(74) *Attorney, Agent, or Firm* — Knobbe Martens Olson & Bear, LLP

(57) ABSTRACT

A method for retrieving a desired postal address from a plurality of postal addresses. The invention can feature receiving input data having input terms for finding the desired postal address from a first database of postal addresses where each postal address is formed of a plurality of postal address elements, searching a dictionary for entries in the dictionary corresponding to the input terms, determining that each entry in the dictionary that corresponds to the input terms corresponds to postal address elements of one or more postal addresses in the first database, and outputting data representing the desired postal address. The desired postal address is found in the first database if an address in that database has postal address elements that correspond with each of the entries of the dictionary that corresponds to one or more of the input terms.

15 Claims, 5 Drawing Sheets

U.S. PATENT DOCUMENTS

| | | | |
|---|---|---|---|
| 6,246,794 B1 * | 6/2001 | Kagehiro et al. | 382/185 |
| 6,256,630 B1 * | 7/2001 | Gilai et al. | 1/1 |
| 6,457,012 B1 | 9/2002 | Jatkowski | |
| 6,651,220 B1 * | 11/2003 | Penteroudakis et al. | 715/236 |
| 6,734,568 B2 * | 5/2004 | Matsuo et al. | 257/781 |
| 6,741,724 B1 | 5/2004 | Bruce et al. | |
| 6,879,983 B2 * | 4/2005 | Bellamy et al. | 1/1 |
| 6,988,129 B2 | 1/2006 | Quine | |
| 7,200,602 B2 | 4/2007 | Jonas | |
| 7,366,726 B2 * | 4/2008 | Bellamy et al. | 1/1 |
| 7,370,044 B2 | 5/2008 | Mulhern et al. | |
| 7,693,853 B2 * | 4/2010 | Bellamy et al. | 382/101 |
| 2002/0059142 A1 | 5/2002 | Krause et al. | |
| 2003/0182018 A1 | 9/2003 | Snapp | |
| 2003/0212600 A1 | 11/2003 | Hood, III et al. | |
| 2005/0021856 A1 | 1/2005 | Basile et al. | |

FOREIGN PATENT DOCUMENTS

| | | |
|---|---|---|
| EP | 0 584 607 A2 | 3/1994 |

* cited by examiner

METHOD AND APPARATUS FOR RETRIEVING DATA REPRESENTING A POSTAL ADDRESS FROM A PLURALITY OF POSTAL ADDRESSES

PRIORITY CLAIM

This application is a continuation of U.S. application Ser. No. 12/111,002, filed on Apr. 28, 2008, now U.S. Pat. No. 7,693,853 which is a continuation of U.S. application Ser. No. 11/103,306, filed on Apr. 11, 2005, now U.S. Pat. No. 7,366,726 which is a continuation of U.S. application Ser. No. 09/976,399 filed on Oct. 12, 2001, now U.S. Pat. No. 6,879,983, which claims priority to Great Britain patent application 0025042.3, filed on Oct. 12, 2000, the entireties of all of which are incorporated herein by reference.

FIELD

The present invention relates to a method and apparatus for retrieving data representing a postal address from a database representing a multiplicity of postal addresses and also to a computer program product executable in a processor to perform such a method and to a data product operable on by a processor to enable the method to be performed.

BACKGROUND

The present invention relates to providing an apparatus, for example, a computer system that operates on a database representing a multiplicity of postal addresses enabling a user to retrieve a postal address from the database by providing the computer system with input data, for example a postal code (referred to in some countries as a zip-code).

Some systems for performing this task are known in the prior art and facilitate obtaining full postal address details of a given postal address on the basis of partial input data leading to, for example, fewer keystrokes being required to be entered by a keyboard operator to obtain a full postal address. Furthermore, if the database on which the computer system operates is accurate and up to date (for example, if the database is provided by the relevant postal authorities), a postal address can be retrieved that is both accurate and correctly formatted (i.e. a correctly laid out address in accordance with the practice of the postal authorities in the relevant region).

A common situation where such a system is especially useful is when a customer gives details of an address over the telephone. The person receiving such information can readily access the database of addresses and find the correct address on the basis of the information given orally, which being open to possible misinterpretation might otherwise lead to incorrect address details being entered. Such a system is also of benefit when entering address details from hand-written information, which may be incomplete or difficult to read.

One such computer system of the prior art is a computer programmed with the product sold by QAS Limited known as QuickAddress™ PRO V3 (Version 3). The software of that product was written for use with a database of postal addresses in the UK. The search engines and the data structures used were designed around the British format of addresses and, in particular, the postcode system presently adopted in the UK. In the UK a postcode represents, on average, about 15 addresses. Providing the system with a postcode might therefore require the operator only to enter a house number in order to obtain full details of a unique postal address.

In countries other than the UK, postal codes (sometimes referred to as zip-codes) may relate to many more than 15 addresses and may in some countries cover more than one town. The software, in particular the search engines used, and the data-structures used in QuickAddress™V3, being tailored for use with UK addresses, may not therefore be the most appropriate for use in a computer system for retrieving addresses relating to a country other than the UK.

Another example of the prior art is a computer programmed with the product sold by QAS Limited known as QuickAddress™ PRO World Version (Version I). The software of that product was written for use with a database of postal addresses of any country (i.e., not limited to the UK). The software used to search for postal addresses makes use of a searching method known as "pattern matching". Input terms are converted into a series of three letter strings which are compared with a store of all possible three letter strings together with the postal addresses having such three letter strings contained within them. Such a method of searching can be time consuming and may require a significant amount of memory to be available in which to store the data relating to each possible three letter string and the associated postal addresses (or parts thereof) containing such a string.

The present invention therefore seeks to provide an improved method of and apparatus for retrieving data representing a postal address from a database representing a multiplicity of postal addresses. The present invention also seeks to provide a computer program product executable in a processor to perform such an improved method and to a data product operable on by a processor to enable such a method to be performed.

SUMMARY

One embodiment of the invention is a method for retrieving a desired postal address from a plurality of postal addresses. In this embodiment, the invention features receiving input data having input terms for finding the desired postal address from a first database of postal addresses where each postal address is formed of a plurality of postal address elements, searching a dictionary for entries in the dictionary corresponding to the input terms, input terms, determining that each entry in the dictionary that corresponds to the input terms corresponds to postal address elements of one or more postal addresses in the first database, and outputting data representing the desired postal address. In this embodiment, the desired postal address is found in the first database if an address in that database has postal address elements that correspond with each of the entries of the dictionary that corresponds to one or more of the input terms.

In the embodiment of the invention discussed above, each entry in the dictionary corresponds to at least one of the postal address elements of the first database. In addition, the dictionary can be in the form of a tree data structure having a plurality of nodes including a root node and terminating in a multiplicity of leaf nodes. The path from the root node to one of the leaf nodes in the dictionary can represent one of the postal address elements. The dictionary can also be in the form of a modified "trie" data structure where each node represents a portion of an entry in the dictionary.

In the embodiment of the invention discussed above, the first database of postal addresses can also be in the form of a tree data structure having a plurality of nodes including a root node and terminating in a multiplicity of leaf nodes. The path from the root node to one of the leaf nodes in the first database can represent one of the postal addresses.

BRIEF DESCRIPTION OF THE DRAWINGS

FIG. 4b is a schematic diagram illustrating the output of address elements according to the embodiment of FIG. 4a.

DETAILED DESCRIPTION

Figure 1:
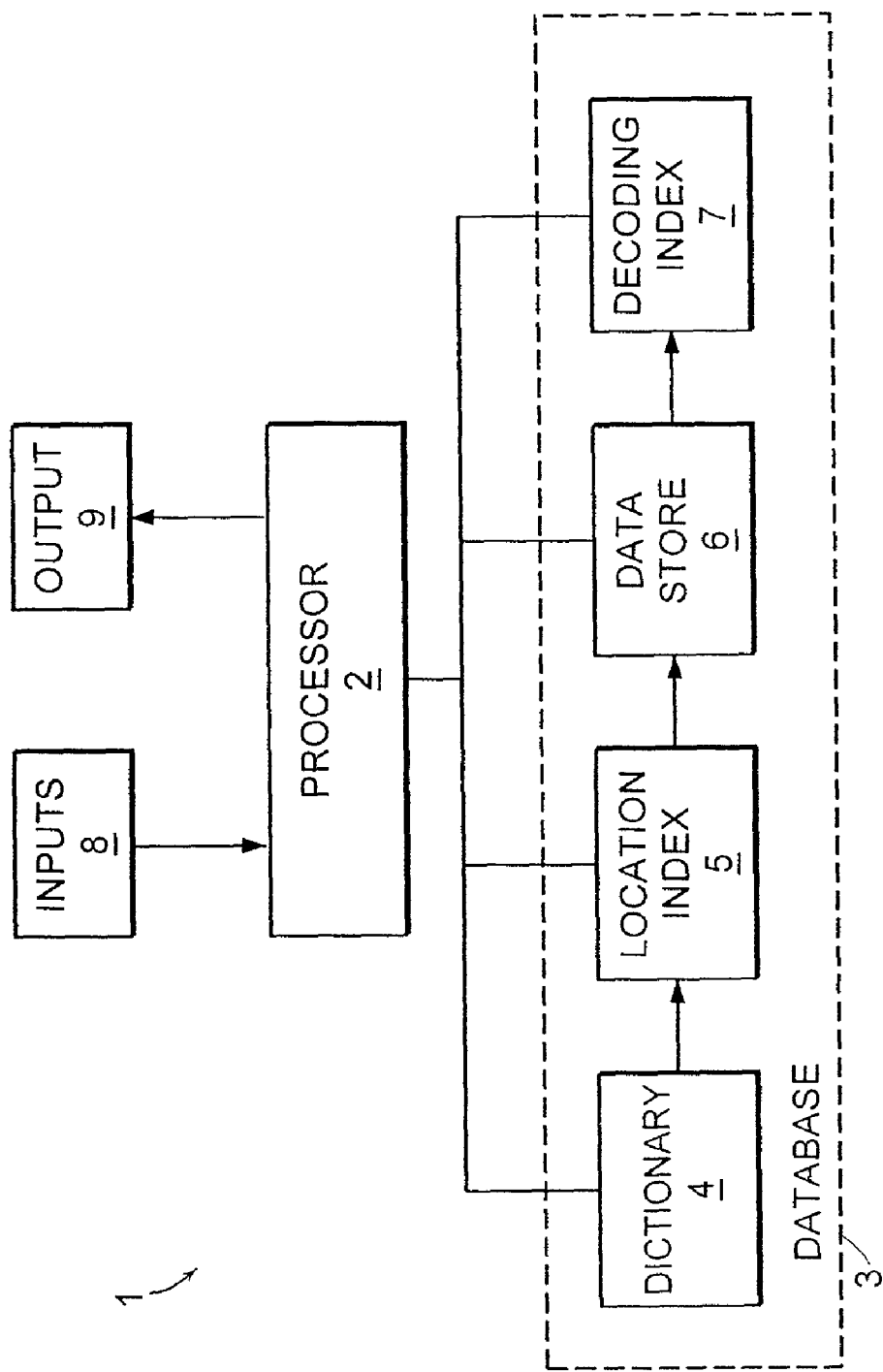
FIG. 1 is a schematic block diagram giving an overview of operation of a system according to one embodiment of the invention.

According to a first aspect of the present invention there is provided a method of retrieving data representing a postal address from a database representing a multiplicity of postal addresses. In this embodiment, the method includes the use of a first database and a dictionary. The first database is a first machine-readable database comprising data representing a multiplicity of postal addresses, each postal address being formed of one or more postal address elements. The dictionary is in the form of a second machine-readable database, and tile dictionary includes data representing entries, each entry corresponding to at least one postal address element represented by the data of the first database. The dictionary can also be in the form of a tree data structure, having a root node and terminating in a multiplicity of leaves, the path from the root node to a leaf being representative of an element of a postal address. The method in this embodiment also uses a processor able to access the data stored in the first and second machine-readable databases. Generally, in this embodiment of the method of the invention, the processor can receive input data having one or more input terms for finding a postal address represented in the first database, search the dictionary for entries in the dictionary corresponding to the one or more input terms, ascertain information concerning data in the first database representing the or each postal address element corresponding to the or each entry in the dictionary determined by the processor as corresponding to the one or more input terms, and output data representing the or each postal address, if any, represented by the first database determined by the processor in view of the information ascertained as being in accordance with the input data.

Having a dictionary arranged as a tree data structure facilitates, as is explained in more detail below, the retrieval of a target postal address (i.e. the postal address intended to be retrieved by the input data) without the need for relying on a particular format of postal code. Furthermore, having a dictionary arranged in such a way allows the searching to be carried out in a more efficient manner than the prior art method using three letter strings.

It will be understood that a leaf node generally represents a termination point within the tree, although in relation the present invention a termination point need not necessarily be a "pure" leaf node (as is explained further below).

The databases are preferably in electronic format readable by a computer processor. For example, the databases may each be partially or wholly stored in RAM, ROM, CD-ROM, disc, tape or any other electronic storage media.

The output data concerning the or each postal address found by the processor preferably includes data in addition to the data required to represent the letters that form the postal address elements of the full address. For example, the additional output data may include data representing control characters, formatting characters or the like. For example, the additional data may comprise data representative of carriage returns, end of string data or the like. Preferably, the output data is in a form that allows the data to be imported into a separate computer application; in such a case, for example, the additional output data may, for each postal address element of the address, include data indicating the category (or type) of postal address element.

Preferably, the output data is in a form that enables a printer, when required, to print the address on a print medium, such as for example paper, a label, or the like. The method preferably includes a step in which the output data is eventually printed out as a postal address onto a print medium, the print medium being affixed to, or forming a part of, an item of post. The item of post may then be sent to the intended recipient via conventional postal delivery services.

The first database of data representing a multiplicity of postal addresses may conveniently be formed as a tree data structure having a root node and terminating in a multiplicity of leaves, the path from a root node to a leaf being representative of a postal address. Nodes closer to the root node may, for example, represent geographical wider regions than those nodes closer to the leaves. For example, for a database of postal addresses in the USA, the nodes in the first level below the root node (i.e. further away from the root) may represent the states forming the USA and the nodes in the next level may represent counties within each state.

Each postal address element may be comprised of a line of the address. Each postal address element may comprise subelements, for example, separate words. For example, the words "NEW YORK" may form a single postal address element. Alternatively, one postal address element may be required to represent each word or sub-element of an address. Advantageously, there is provided data enabling the processor to determine whether a pair of nodes, of the first database, at different locations (for example, at different levels) in the tree data structure relate to the same postal address. For example, each node in the tree may be assigned an off-set value indicating the distance in memory to the next node at the same level, the data being so arranged that two nodes stored in memory relate to the same address if the offset value associated with the first node in memory (the second node being stored further ahead in the linear memory store) is greater than the distance in memory from the first node to the second node. Such an arrangement may simply be a linear store of the nodes, all the descendants of any given node being located after that node, in the linear store, and before the next node in the linear store that is not a descendent of said given node. For example, if node A has children nodes B and C, child node B having children nodes D and E and child node C having child nodes F and G the order of storage of those nodes would be A, B, D, E, C, F, G. The data enabling the processor to determine whether a pair of nodes of the first database relate to the same postal address need not, or course, include information regarding the respective levels of the nodes in the tree data structure.

Preferably, the data representing each postal address element in the first database comprises a code for the address element. Having such codes enables the data representing the addresses to take up less storage space. For example, certain words may occur many times within different addresses represented by the data. Such a word may be allocated a code, the code taking up less space than the space required to represent each of the letters of the word. Each code may be in the form of a pointer pointing to a location in a memory where a representation of the characters forming the postal address element is stored. Preferably there is provided a separate data store, in addition to the dictionary, enabling the codes representing postal address elements to be decoded by reference to the separate data store. That separate data store may then be designed to allow the processor access to full and correctly formatted representations of the address elements, whilst the dictionary may be formed without distinction to different formatting thereby facilitating a more comprehensive searching for address elements corresponding to an input term.

In one embodiment, data is provided that enables the processor to determine whether a pair of nodes in the first database are part of the same postal address. The structure of the first database can be the data used to determine whether a pair of nodes are part of the same postal address.

As mentioned above, the method includes the step of providing a dictionary in the form of the second machine readable database, the dictionary comprising data representing entries, each entry corresponding to at least one postal address element represented by the data of the first database. Further advantageous or preferred features relating to that dictionary will now be discussed. Preferably each entry, represented by the path from each leaf of the tree to the root, of the dictionary is unique. Thus, the same address element represented in different parts of the first database corresponds to only one entry in the dictionary. However, there may be more than one dictionary. The dictionary may also comprise more than one tree structure. Separate dictionaries or separate tree structures of a dictionary, may facilitate faster searching. Generally, one dictionary is searched at a time, and this one dictionary can be searched for one or more search terms in parallel. When the search of this first dictionary is complete, a second dictionary can be searched for terms as well. After all of the dictionaries have been searched, the matches can be cross-referenced to see if they occur in the same address.

Advantageously, the dictionary is so arranged that the nodes of the tree data structure after the root node each contain data representing a portion of the or each entry in the dictionary sharing the unique stem defined by the path from the root to that node and a plurality of the nodes have a plurality of such portions. The data structure may effectively be considered as a modified "trie" data structure, wherein each node effectively represents a single portion, but the data representing said portion is held in the parent node. The nodes preferably contain data relating to a number of separate portions, said number being greater than or equal to the number of child nodes. Such a structure may facilitate faster searching of the dictionary, because the processor can discount child nodes as being irrelevant to the search in question without having to follow a pointer to such child nodes.

Some of the portions representing the data may include a middle part only of the entry, thereby excluding both the stem and the end of the entry.

Preferably, each portion in a node in the dictionary either acts as a termination point or has a single path leading from it to another node in a lower level in the tree (further away from the root node). Preferably, the or each portion of the or each node in the dictionary data structure has no more than one child node. It will be understood that a node can include a termination point (the node effectively acting partly as a leaf and partly as a parent node). A node may also include a plurality of termination points. The data tree may include pure leaf nodes (i.e. childless nodes) and mixed leaf/parent nodes (i.e. nodes having at least one child and at least one termination point). For example, a node of the tree of the dictionary may represent many elements sharing the same stem, the stem itself being a postal address element (for example, a node wherein the path from the root to the node represents "LONDON", which is itself an address element, must also have pointers to nodes in lower levels if elements such as "LONDONDERRY" or "LONDON ROAD" are to be represented). The dictionary thus preferably includes data representative of end of string characters.

Conveniently the last character of the portion of each dictionary entry represented by a termination point, whether a leaf by itself or part of a parent node acting as a leaf, is a character or data flag representative of the end of a string.

Preferably, each of the plurality of portions represented within a node of at least some nodes of said plurality of nodes is a single character. For example, if a node of the tree data structure representing the dictionary has more than two child nodes, it is preferable that each respective portion of the node is a single character. At least some nodes may be such that all of the portions are a single character. The root node may be one such node, for example.

Preferably, the dictionary is so arranged that at least some of said portions of the nodes each comprise a plurality of characters. For example, in the case of a given node either having only one child node or being a pure leaf node, if the given node could otherwise be represented as a series of single child nodes it is preferable for the node to represent the series of nodes collapsed into a single node, so that the given node contains all the characters as a single portion that would otherwise be represented by that series of single child nodes. By way of example, consider the dictionary structure that may be used to represent the elements "BAKER STREET¶", "BAKER SQUARE¶", "BRISTOL ROAD¶" and "LONDON¶", only, wherein the "¶" character represents the end of the address element. The structure may be as follows: a first node (the root node) contains two portions, one containing a "B" the other containing an "L"; the "L" portion of the root node points to a pure leaf node containing the portion "ONDON¶"; the pointer from the letter "B" in the root node points to a second node containing the portions "A" and "R"; the pointer from the "A" portion points to a third node having a single portion containing "KER S"; the pointer from "R" points to a pure leaf node containing the portion "ISTOL ROAD¶"; the pointer from the "KER S" points to a node having the portions "T" and "Q", the "T" portion pointing to a leaf representing "REET¶" and the "Q" pointing to a leaf representing "UARE'¶".

The dictionary structure may be a structure equivalent to a trie structure, where the letters in the nodes have effectively been promoted back towards the root to their parent nodes.

The step of searching the dictionary for entries corresponding to the input terms is preferably performed so that each time the processor searches the dictionary, the processor accesses the data relating to any given node in the dictionary no more than once. This step may, however, be performed such that the processor searches the dictionary more than once as is explained below; in such a case the processor may access a given node in the dictionary more than once during this step, but the processor preferably accesses the data in that node no more than once per search of the dictionary.

Advantageously, the dictionary is stored in memory (whether RAM, ROM or otherwise) such that the processor is able to have faster access to those nodes in the dictionary that are most commonly accessed compared with the access times relating to nodes that are accessed less frequently. For example, the dictionary may be stored as a linear store of the nodes, the root node being stored as the first node in the linear store, the child nodes of the root node being stored directly thereafter and the child nodes of those child nodes being stored after the last child node of the root node, and so on. Storing the nodes of the dictionary in such a way also allows the pointers that enable the processor to find the child nodes of a given node to be expressed as offset values, wherein those offset values are generally relatively small in size (and therefore collectively take up less memory than they might if the nodes were stored in another manner) owing to the fact that the children of a given node may be grouped together.

Preferably, the dictionary may be stored such that nodes in a level closer to the root node are stored closer to the beginning of the linear memory store than nodes in levels further away from the root node. Preferably, at least the root node is stored in fast memory (i.e. a memory medium, such as RAM memory, that the processor is able to access faster than other types of memory media, such as for example a hard disk). More preferably, at least the root node and its children nodes are stored in fast memory. Even more preferably, the root node and the nodes in a plurality of levels below the root node are stored in fast memory.

The step of searching the dictionary for entries corresponding to the input terms may be so performed as to find if there is an entry in the dictionary that corresponds exactly to each input data term. If more than one input data term is inputted and all the data terms have entries in the dictionary corresponding thereto, and there is a single postal address that contains postal address elements corresponding to all of the dictionary entries found by the processor, then the method preferably outputs data relating to that single postal address. It is likely in such a case that said single postal address is the address intended to be retrieved by the input data.

If however, there are one or more input data terms that do not correspond exactly to any entry in the dictionary and/or there are a plurality of postal addresses that the processor identifies as being possible matches corresponding to the input data, or no such postal addresses are found by the processor, the method may include further steps to either output data indicating the status of the processor's findings (for example to inform a user using the method that a single address could not be found) and/or to perform further steps in an attempt to improve the likelihood of retrieving the intended postal address. The provider of the input data initially provided (the provider, for example, being a user or a machine such as another computer system) might as a part of this process be prompted for further or different input data.

The steps of the method of the invention can include ascertaining the location of each occurrence of data within the first database corresponding to the or each entry in the dictionary, determined by the processor as corresponding to the one or more input terms, and determining from the locations so ascertained the postal address or addresses being in accordance with the input data. For example, the processor may simply determine from the locations of the occurrences the postal address or addresses having (or sharing) the greatest number of occurrences.

In one embodiment, there is provided a separate store of data enabling the processor, without needing to refer to the first database, to determine the location of the or each node within the first database corresponding to an entry in the dictionary and to determine whether a pair of nodes of the first database at different locations in the tree data structure relate to the same postal address. Each entry in the dictionary can, for example, be linked to one or more entries in the separate data store, each entry in the separate data store including a pointer to the location of the node in the first database representing the postal address element corresponding to the dictionary entry and an off-set value indicating the distance in memory from that node to the next node at the same level. The processor may therefore be able to ascertain which of a multiplicity of potential matches in the first database belong to the same postal address, simply be accessing the separate store of data and without needing to access the first database. Thus, the method can include a step in which the processor ascertains from a separate store of data the location of each node in the first database corresponding to the or each entry in the dictionary, determined by the processor as corresponding to the one or more input terms, and then determines from the locations so ascertained in conjunction with data, for example off-set values, from the separate store of data the postal address or addresses being in accordance with the input data, whereby the processor need not access the first database in respect of those nodes which do not correspond to the postal address judged to be in accordance with the input data.

Rather than aiming to retrieve a single address the invention may be used to output data containing details of a plurality of addresses, it being left to the user to select which of those addresses, if more than one are retrieved, is the target address.

The step of searching the dictionary for entries thus preferably includes the processor initially searching the dictionary for any entry in the dictionary identical to the or each input term. If during this step no entry is found that is identical to any of the input terms the processor may then search the dictionary for entries having a lower quality correspondence with the or each input term. For example, on not finding any entries in the dictionary identical to the input data, the processor may then search allowing for one error at first, and if that search fails, performing a further search, allowing for two errors, and so on. A single error may be counted if the search term and the dictionary entry differ by one character being deleted, added or replaced with a different character. The quality of correspondence between two terms may be judged by calculating the "Levenshtein" distance between the two strings.

As mentioned above, the searching of the dictionary is preferably performed so that for each search of the dictionary the processor need access the data represented by each node no more than once. Therefore, if the processor is to allow for one or more errors in an input term, it is preferred that the processor will for any given node allow for more than one of it's child nodes as representing a possible route through the dictionary to a matching entry in the dictionary (allowing for said one or more errors). For example, if the processor is to allow for one error, all of the child nodes of the root node will be of relevance, because the first letter of the input term may be treated as being substitutable by a different character, as being an erroneous added character or as being representative of the second character of a given entry in the dictionary (i.e. the data input term missing the first character of the target dictionary entry). On allowing for one or more errors, the nodes closest to the root node will be of much greater relevance than nodes on levels further away from the root node. Having the data relating to nodes closer to the root node in fast memory is therefore of great advantage when searching the dictionary and allowing for one or more errors in the input terms.

If a plurality of input terms are inputted and the processor finds one or more entries in the dictionary identical to at least one, but not all, of the input terms, respectively, thereby leaving one or more unmatched input terms, then the processor advantageously continues searching the dictionary for entries having a lower quality correspondence with those unmatched input terms. Such a method assumes that if an input term matches a dictionary entry exactly then there is a good chance that the input term is actually correct. Put another way, it may be assumed that there is a relatively high probability that the target postal address includes a postal address element identical to the input term found in the dictionary, it being assumed that it is relatively unlikely for an incorrect data term (i.e. one containing an error) to correspond exactly to a postal address element of a different and therefore incorrect postal address. For example, if the input data includes the terms "LONDRON" and "HEATHROW", the term "HEATHROW" would be matched, but the term "LONDRON" would not; the processor would then proceed to search for dictionary entries corresponding to "LONDRON" allowing for one error, but the processor would not search for the term "HEATHROW" again.

Similarly, the method may be such that if, on reducing the quality of correspondence required for matching an input data term with a dictionary entry, further terms are matched, but other terms are still left unmatched, searches of entries having correspondence of even less quality need only be conducted on those remaining unmatched terms. Such a method of searching may save considerable time that would otherwise be spent on searching for lower quality matches for terms that have already been found to correspond to dictionary entries with a relatively high quality correspondence.

The searching of the dictionary may alternatively search for entries corresponding to the input data terms, the quality of correspondence being within a given threshold, which may be pre-set and may be fixed. For example, the searching of the dictionary may match entries in the dictionary with the input term(s) if the entry and term concerned are within a pre-set edit distance of each other. Many completely different input terms may be searched in parallel so that the passes through the dictionary may be minimized.

The postal address elements forming a postal address may notionally be divided into categories. The categories may simply be the level in the tree of the first database in which the postal address element appears. The categories may be representative of the type of postal address element. There is preferably provided data enabling the processor to ascertain the category of a given postal address element represented by data in the first database. Such data may implicitly be provided by the structure of the first database. The method may thus be able to distinguish between postal address elements being formed of the same characters, but being of a different category. For example, if there were entries in the first database relating to both a town and a county named "ABCDEF", it would be beneficial if the processor were able to distinguish between the two.

In the case where a given postal address element may be attributed with or assigned a category, the processor is preferably able to be provided with input data including an indication of the category of postal address element that each of at least one of the input terms represents. The input data received by the processor may be processed by the processor before the step of searching the dictionary is performed. Alternatively the input data received by the processor may be pre-processed.

The processing of the input data may for example, be for the purpose of reducing the likelihood of a postal address not being found through differences in data syntax between the input terms and the postal address elements represented by the data of either or both of the first and second databases. For example, the dictionary may be formed of certain characters only, "illegal" characters of postal address elements either not being represented in the dictionary or being represented by different characters or in a different order. For example, the entry in the dictionary corresponding to a postal address element including a space, may exclude the space character. Also the entries in the dictionary may, for example, be represented without using any upper case letters. If upper case letters in the input data terms are converted to lower case letters before the dictionary is searched, then the search may be case insensitive.

Entries represented in the dictionary entries may be formed such that information concerning the premise number of an address is excluded. For example, "10 High Street" would be represented in the dictionary as "High Street". Thus, when an input term starting with a number is provided as part of the input data, such data may be processed before searching the dictionary, so to remove the number from the beginning of the input term before searching the dictionary for corresponding entries. Once an entry has been found that matches the input term (with the number deleted) the processor may then ascertain whether the postal address element relating to the input term is represented by a node having nodes representing premise numbers as its child nodes and whether or not any of those child nodes represents the number removed from the input data.

In the case where a postal address element includes a number, which does not relate to a premise number, the corresponding entry in the dictionary is preferably represented by an entry having the relevant number moved to the end of the entry, the dictionary preferably not containing any data relating to premise numbers. The processing of the input data including a number, for example a number appearing at the beginning of the term, preferably comprises of effectively splitting the input term into two terms, one term including the number at the end and the other term excluding the number. Thus the processor is able to match postal address elements with input terms containing numbers whether or not the numbers are representative of premise numbers. Since the two split terms share the same stem, the processor is able to search the dictionary for the two terms in parallel without needing, whilst considering the characters in that stem, to access any more nodes than when searching for only one of the two input terms. Treating numbers in this way therefore saves on storage space for data without significantly increasing processing time and may even reduce the average processing time required to search the dictionary.

The processing of the input data may also include considering whether any given input term includes a set of characters more susceptible to errors (human error) than other sets of characters. The processor may be programmed to recognize such strings, each string being associated with one or more different strings with which it is commonly replaced in error when inputting input data. Preferably the strings associated with a given string relate to terms that are conceptually similar to the given string. For example, the string "STREET" or the string "LANE" might be inputted as part of the input data relating to a given address where the correct string is actually "ROAD". The processor is preferably programmed to search the dictionary in a manner that accounts for such a string as being replaceable with another conceptually similar string. For example, if the input term is "RED LION ROAD" the processor is able to recognize that the string of characters "ROAD" might have been entered in error for the string "STREET".

Advantageously, the processing of the input data includes ascertaining whether any of the input terms correspond to a category of postal address element and if so including an indication of the category in the input data. For example, the processor may be programmed to recognize whether an input data term is in a format corresponding to a postal code (or postcode, zip code or the like), and if so continue the method on the basis that the data term is such a postal code. The dictionary, or other aspects of the data used when performing the method, may be arranged and ordered by category and thus the retrieval of an address may be made more efficient. There may, for example, be separate dictionaries for entries relating to postal elements of a given category.

The category may be based on other characteristics, such as for example, the number of characters required to represent the postal address element.

The data, in particular the first and second databases, used when performing the method is preferably in electronic form. For example, the data may be stored on RAM, ROM, CD ROM, tape, magnetic disc or any other suitable electronic machine readable database.

The input data may be entered manually by a user, for example via a keyboard or other manual data entry apparatus. The output data may initially be provided as a visual indication on a VDU. The output data may alternatively, or additionally (for example, after a suitable confirmation is made by the user) be electronically pasted (i.e. inserted) into a separate data storage area on a computer system. For example, the output data may be pasted into an application running on a computer system.

The input data may be taken from a separate date store. For example, the separate data store may consist of data stored in memory (whether RAM, ROM, CD ROM, on a hard drive or otherwise). The data store may include data relating to an existing database including postal address information. The output data may then be used to remove or to highlight errors in the postal address information in the existing database. The data store may simply relate to data used by or in relation with a separate application running on a computer.

According to a second aspect of the present invention there is also provided a method of retrieving data representing a postal address from a database representing a multiplicity of postal addresses. In this embodiment, a processor is used along with a database and a dictionary. The database is accessible by the processor, and includes data representing a multiplicity of postal addresses, and the dictionary is a dictionary of terms corresponding to those found within the postal addresses. The database also includes location information enabling the processor to ascertain the one or more postal addresses in the database having a term corresponding to each dictionary entry. The method then involves providing the processor with input data for finding a postal address in the database, searching the dictionary for entries corresponding to the input data, ascertaining from the location information if any postal address in the database corresponds sufficiently closely to the input data and outputting data relating to the results.

The database operated on during the performance of the method according to the second aspect of the invention may effectively comprise a first data structure, a second data structure, a third data structure, and a fourth data structure. The first data structure includes data representing a multiplicity of postal addresses, each postal address being formed of one or more postal address elements, and the first data structure can include respective codes representing respective postal address elements. The second data structure can be in the form of a dictionary, comprising a multiplicity of entries, with each entry corresponding to at least one postal address element represented by the data in the first data structure. The third data structure can link each code in the first data structure to data from which the postal element represented by the code can be directly ascertained. Finally, the fourth data structure can include data linking a given entry in the second data structure with each item of data in the first data structure representing the postal address element corresponding to the entry in the second data structure.

Alternatively, or additionally, the dictionary may be in the form of a tree data structure, having a root node and terminating in a multiplicity of leaves, the path from the root node to a leaf being representative of term within a postal address in the database.

It will be readily appreciated by those skilled in the art that features of the first aspect of the present invention may be incorporated into the second aspect of the present invention and vice versa. For example, the processor advantageously initially searches the dictionary for entries corresponding exactly to the input data and then, if one or more terms included in the input data are matched but other terms are not, the processor preferably continues the search in the dictionary for entries having a lower quality correspondence with those unmatched terms, whilst not searching for further entries in the dictionary for those terms where entries exactly matching those terms have already been found.

Another example of features of the first aspect of the present invention that may be incorporated into the second aspect of the present invention, are those features relating to the input data provided to the processor being processed or pre-processed before the dictionary is searched. Thus, the input data may be processed (or pre-processed) by the processor, for example, to reduce the likelihood of a postal address not being found through differences in syntax between the input data used to search the dictionary and the data representing the multiplicity of postal addresses of the database.

According to the first aspect of the invention there is also provided an apparatus for retrieving data representing a postal address from a database representing a multiplicity of postal addresses. The apparatus includes a computer processor, a first database, accessible by the processor, comprising data representing a multiplicity of postal addresses, each postal address being formed of one or more postal address elements, and a dictionary in the form of a second database, accessible by the processor, comprising data representing entries, each entry corresponding to at least one postal address element represented by the data of the first database. The dictionary can be in the form of a tree data structure having a root node and terminating in a multiplicity of leaves, the path from the root node to a leaf being representative of an element of a postal address. In this embodiment, the processor can be programmed to be able to receive input data comprising an input term for finding a postal address represented in the first database, to search the dictionary for entries in the dictionary corresponding to an input term, to ascertain information concerning data in the first database representing the or each element corresponding to the or each entry in the dictionary determined by the processor as corresponding to an input term, and to output data representing the or each postal address, if any, represented by the first database determined by the processor as being in accordance with the input data.

The apparatus may, of course, be arranged to be able to perform a method according to the first aspect of the present invention.

According to the second aspect of the invention there is also provided apparatus for retrieving data representing a postal address from a database representing a multiplicity of postal addresses. In this embodiment, the apparatus includes a computer processor and one or more databases, accessible by the processor, of data representing a multiplicity of postal addresses, a dictionary of terms found within the postal addresses, and information enabling the processor to link a given entry in the dictionary with the one or more postal addresses in the database having a term corresponding to the dictionary entry. The processor in this embodiment is programmed to be able to receive input data for finding a postal address in the database, to search the dictionary for entries corresponding to input data, to ascertain if any postal address in the database corresponds sufficiently closely to the input data, and to send output data relating to one or more postal addresses in the database.

The apparatus may, of course, be arranged to be able to perform a method according to the second aspect of the present invention.

The apparatus according to any aspect of the invention may, for example, be a conventional computer system loaded with the appropriate software and provided with the appropriate data.

The present invention yet further provides a computer program product executable in a processor to perform a method according to any aspect of the present invention as described above, when provided with the appropriate data for the programmed processor to operate on. The computer program product may take the form of a computer program stored on an electronic data carrier, such as a computer, ROM, RAM, CD ROM, magnetic disc or tape or any other form of electronic recording media.

The present invention also provides such a computer program product together with a data product, the data product enabling a processor once programmed with the computer program product to perform the method according to any aspect of the present invention as described above. The data product may be in the form of data stored on an electronic data carrier, such as a computer, ROM, RAM, CD ROM, magnetic disc or tape or any other form of electronic recording media.

It will be appreciated that the postal addresses represented by the data referred to above need not each represent a unique postal address in reality. For example, the postal address represented by the data may require the addition of a name of a person (an individual, or corporate body for example) and/ or the number or name of the relevant premises. Such data may of course be manually added to the output data before the output data is used to mail any items to the intended postal address.

According to yet another aspect of the present invention there is provided a data product, accessible by a computer processor, the data product including data representing a multiplicity of postal addresses, each postal address being formed of one or more postal address elements, a dictionary comprising data representing entries, each entry corresponding to at least one postal address element represented by data in the data product, wherein the dictionary is in the form of a tree data structure, having a root node and terminating in a multiplicity of leaves, the path from the root node to a leaf being representative of an element of a postal address, and data linking a given entry in the dictionary with the one or more postal addresses in the data product having a term corresponding to the dictionary entry.

Such a data product advantageously enables a suitably programmed computer processor to search the dictionary for entries in the dictionary corresponding to an input term, and to find data in the first database representing the or each address clement corresponding to the or each entry in the dictionary determined by the computer processor as corresponding to an input term, whereby the data product may be used to find a postal address represented by the data product in response to input data comprising one or more input terms.

The present invention also provides a data product, accessible by a computer processor, the data product including a first data structure, a second data structure, a third data structure, and a fourth data structure. The first data structure represents a multiplicity of postal addresses, each postal address being formed of one or more postal address elements, the first data structure comprising respective codes representing respective postal address elements. The second data structure can be in the form of a dictionary including a multiplicity of entries, with each entry corresponding to at least one postal address element represented by the data in the first data structure. The third data structure can link each code in the first data structure to data from which the postal element represented by the code can be directly ascertained. Finally, the fourth data structure can include data linking a given entry in the second data structure with each item of data in the first data structure representing the postal address element corresponding to the entry in the second data structure.

Such a data product advantageously enables a suitably programmed computer processor to search the second data structure for entries corresponding to an input term, on finding an entry to find data in the first database representing the or each address element corresponding to the or each entry in the dictionary determined by the computer processor as corresponding to an input term, whereby the data product may be used to find a postal address represented by the data product in response to input data comprising one or more input terms.

As has been mentioned above, providing a separate data store, in addition to a dictionary, enabling the codes representing postal address elements to be decoded by reference to the separate data store enables that separate data store to be designed to allow the processor access to full and correctly formatted representations of the address elements, whilst the dictionary may be formed without distinction, for example, to different formatting thereby facilitating more efficient and/or comprehensive searching for address elements corresponding to an input term.

The data products described above may be used in the method of the present invention as described above in relation to the first and/or second aspects of the present invention. As such, the data products may be configured and arranged to be suitable for use in the above-described methods of the present invention, the data products thereby possibly incorporating any of the features described above in connection with those methods. For example, the coded postal address database structure may be in the form of a tree data structure. Also, the dictionary is preferably formed as a modified trie data structure as described above.

Throughout the above general description of the various embodiments of the invention, and below in the claims, various databases and data structures have been described in a way which might suggest that data is formed either as a unitary data collection or as a group of separate but interconnected data collections. As will be appreciated, there are many ways in which the present invention may be implemented provided that the effective underlying structure of the computer program product, computer software, and/or data is in accordance with the principles as set forth above.

By way of example, an embodiment of the invention will now be described with reference to the accompanying drawings. FIG. 1 shows a system 1 comprising a processor 2 and a data base 3. The database 3 comprises a dictionary 4, a location index 5, a coded postal address data store 6 and a postal address element decoding index 7. The processor 2 is able to access the data stored in the database 3, to receive input data 8, generally in the form of search terms relating to at least part of an address to be searched and to send output data 9, generally in the form of a full and correct postal address.

The coded postal address data store 6 includes representations, in the form of codes, of a multiplicity of postal addresses, each postal address being formed of at least one postal address element. For example, a postal address may comprise a premise name element, a house number element, a street name element, a town element, a county element and a postal code element (such a postal address thus consisting of six postal address elements). The actual address elements being represented in the coded postal address data store 6 as codes are able to be decoded by the processor 2 with reference to the postal address element decoding index 7.

The dictionary 4 comprises entries relating to each different postal address element occurring in the index 7. Each entry in the dictionary 4 may therefore correspond to many different entries within the coded postal address data store 6. The location of each entry in the coded postal address data store 6 corresponding to a dictionary entry can be ascertained by the processor 2 by reference to the location index 5.

The operation of the system 1 may be summarized with reference to FIG. 1 as follows. A user enters input terms 8, as strings of characters, which are received by the processor 2. The processor pre-processes the input terms 8 (as will be explained in further detail later) and then searches the dictionary 4 for entries corresponding to the input terms 8. On finding entries in the dictionary 4 corresponding to the input terms 8 the processor 2 then ascertains, by means of the location index 5, the locations in the coded postal address data store 6 corresponding to the dictionary entries matching the input terms 8. If the processor 2 ascertains that there is a single postal address represented in the coded postal address data store 6 with postal address elements matching all of the input terms 8 then the processor 2 decodes the data in data store 6 corresponding to the postal address by reference to the postal address element decoding index 7. The results are then returned to the user as output data 9. The output date 9 can, for example, be displayed on a VDU (not shown) and may be pasted into whichever application on the computer system the user wishes to have the address output data entered.

For example, if the user enters the input terms "RED LION STREET" and "LONDON", entries in the database corresponding to the addresses "Red Lion Street, Southampton" and "High Holborn, London" will each contain only one match for the input terms 8 entered, but the address "Red Lion Street, London" would have two matches and would be chosen by the processor 2 as the appropriate address to be returned to the user as the output data 9.

Figure 2:
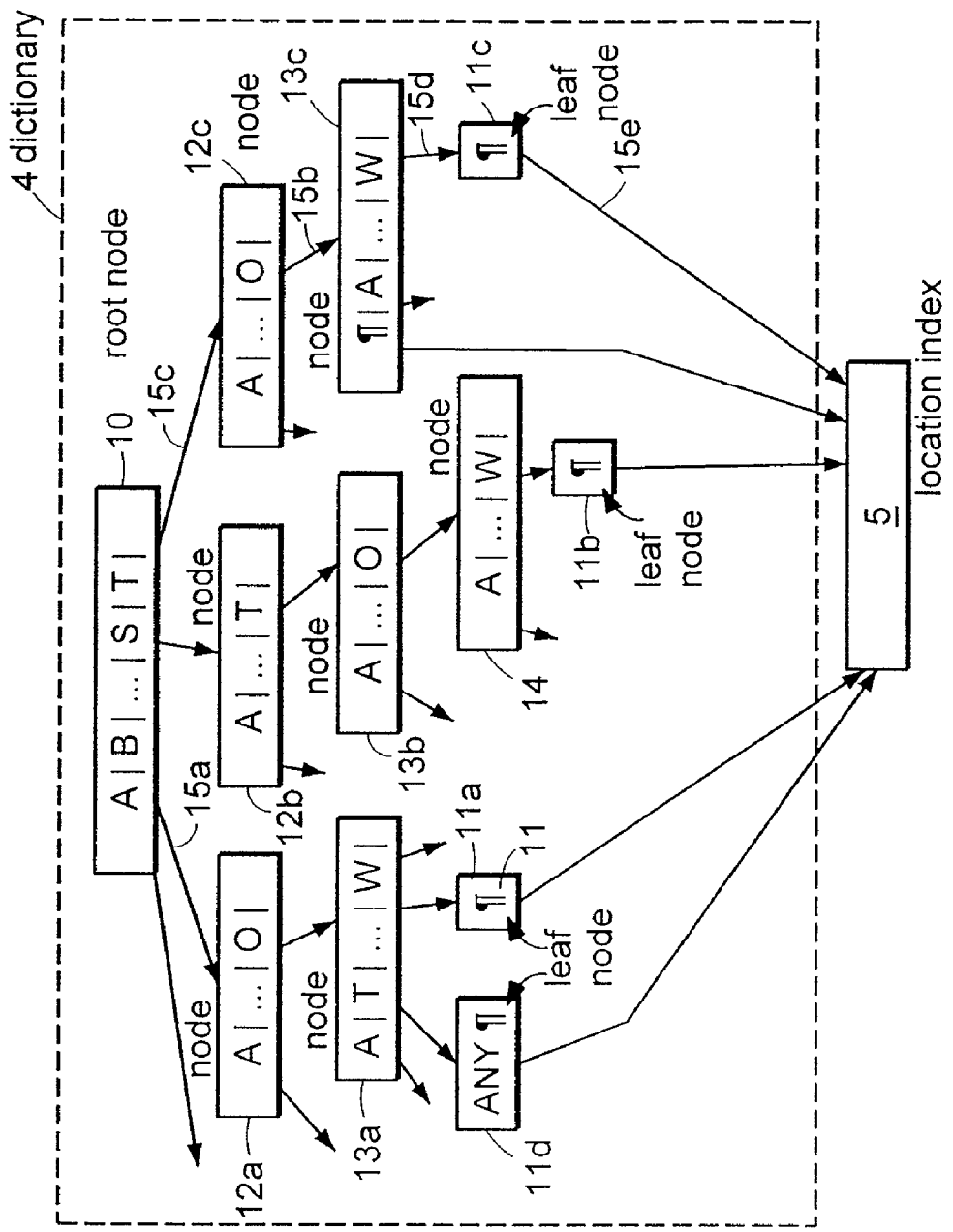
FIG. 2 is a schematic diagram illustrating how postal address data is arranged within the system in one embodiment of the invention.

FIG. 2 shows schematically the arrangement of the dictionary 4. The dictionary 4 is arranged as a tree structure, having a root node 10 and terminating in a multiplicity of leaves 11. The path from the root node 10 to a leaf 11 being representative of a postal address element. The dictionary structure may be described as a modified trie structure. In a conventional trie structure each node of the tree represents a single character of a word, the path from the root to a leaf spelling out the word represented by the leaf. The present data structure however, has nodes comprising the letter or letters represented by its child nodes. The structure may be thought as a trie structure where the characters of each node have been promoted to the node above (the parent node), each node thus possibly representing many characters (or a single string of characters—as discussed below) but each character being associated with only one branch to a lower level. Thus the root node 10 of the present data structure includes the initial characters of all of the entries in the dictionary, the nodes on the next level down each contain the second letters of entries in the dictionary with a given first letter. For example in FIG. 2, node 12*a* pointed to by pointer 15*a* associated with the letter "B" of node 10 contains details of the second letters of all entries in the dictionary starting with the letter "B". In other words the tree is arranged such that nodes effectively represent a single letter, but the information concerning what that letter is, is held in the parent node together with information concerning other sibling nodes.

One important exception to the nodes each representing one or more single letters is shown in FIG. 2. Node 11*d* includes the letters "ANY¶" so that the path from the root node reads BOTANY¶". The characters at the end of the entry are combined into a single leaf, rather than having a string of single child nodes terminating in a single leaf. The data space required to hold the dictionary 4 may thus be reduced. Node 11*d* is, as can be seen from FIG. 2*a*, a leaf node but it is possible for the dictionary to comprise nodes that are not leaf nodes where the node represents a plurality of characters representing dictionary entries sharing the same stem followed by those characters, and possibly other characters thereafter. The dictionary is arranged such that only single child nodes contain such a string of characters.

Figure 3:
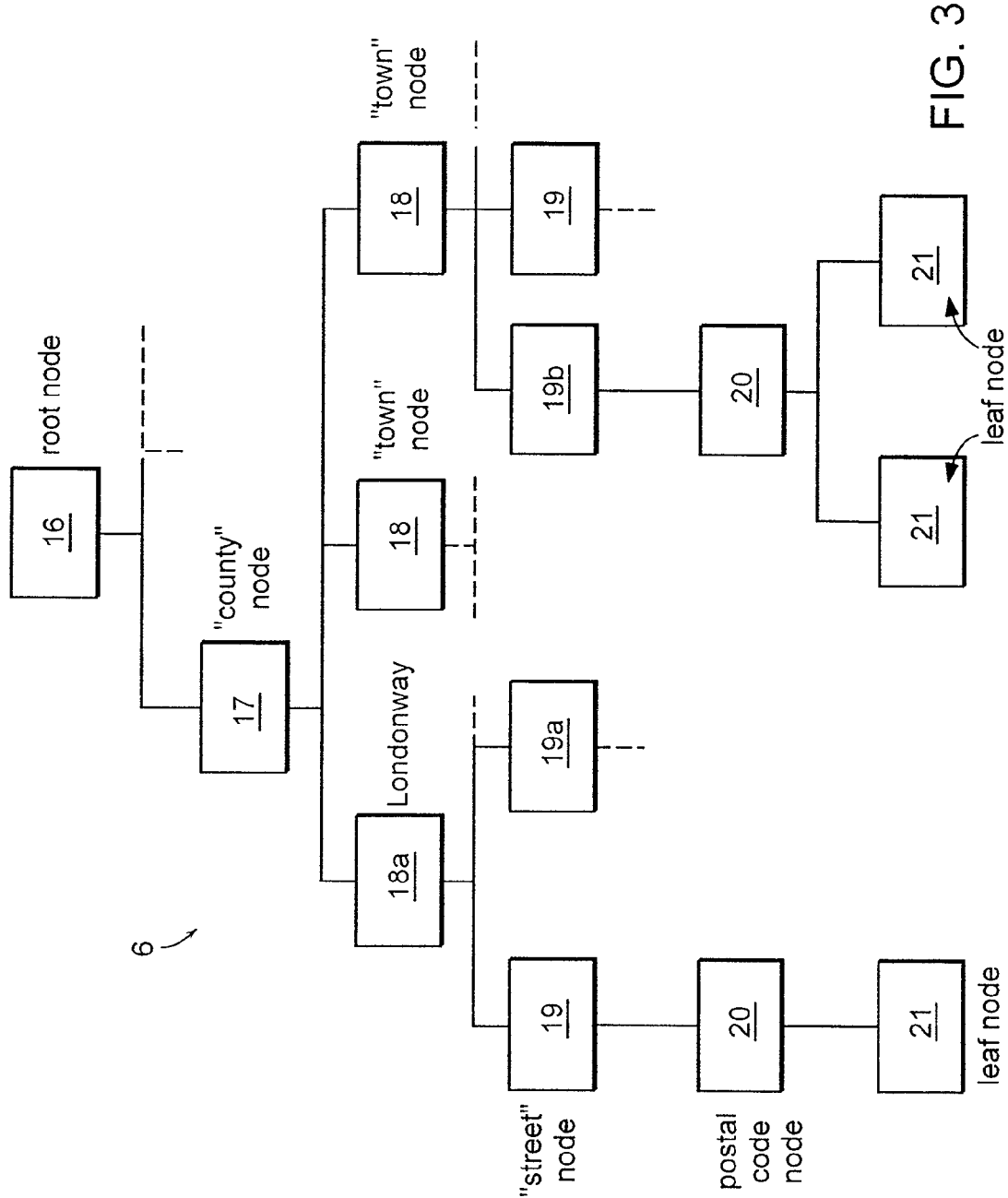
FIG. 3 is a schematic diagram illustrating how the dictionary of the system is arranged in one embodiment of the invention.

FIG. 3 shows schematically how data is arranged in the coded postal address data store 6. The data 6 is stored as a tree, each node representing a postal address element, and the path from the root node 16 to a leaf node 21 representing a postal address. The tree structure shown in FIG. 3 is arranged such that the regions represented by nodes within the tree become smaller the closer the node is to a leaf node 21. Nodes 17 in the level below the root node 16 represent a county, nodes 18 on the level below that representing towns, the nodes 19 below that representing street names, the nodes 20 below that representing postal codes and the leaf nodes 21 representing house numbers or names. Rather than representing each character of the postal address element represented by a node the nodes contain codes representative of a postal address element. For example, if node 18*a* represents a town named "LONDONWAY" and the node 19*b* represents a street also named "LONDONWAY", the contents of both nodes 18*a* and 19*b* would include a code representative of the word "LONDONWAY". The processor 2 is able to decode the codes in the coded postal address store 6 by reference to the postal address element decoding index 7.

The nodes in the coded postal address store 6 are actually stored in memory (whether RAM, ROM or otherwise) as a linear data store. Each node in the coded postal address data store 6 includes information regarding the location in the linear data store of the next node after its children and their descendants. The data store 6 is thus arranged linearly in memory (whether RAM, ROM or otherwise), each node being immediately followed by its children so that children may be separated by their children, if any, but not by nodes in a level closer to the root node. For example, if node A has children nodes B and C, child node B having children nodes D and E and child node C having child nodes F and G the order of storage of those nodes would be A, B, D, E, C, F, G. The associated information with a given node regarding the location of the node immediately after the last of its direct descendants, if any, is in the form of an offset value (i.e. a value representative of the distance in the linear data store in memory between the two nodes). Thus the processor 2 is able to determine with reference to the data store 6 as to whether or not two nodes relate to the same postal address, by calculating whether the node stored further along in the data store 6 is within a distance less than the offset distance associated with the two nodes. When input terms 8 are entered that relate to many occurrences within the coded postal address data store 6 the processor 2 is therefore able to ascertain whether there is a single address containing an occurrence corresponding to each term 8 entered (or which, if any, of the addresses have the most occurrences compared with the other addresses).

The searching of the dictionary 4 via the processor 2 will now be described, in more detail, with reference to FIG. 2. Firstly, the data input terms 8a and 8b are pre-processed by the processor to convert all upper case letters into lower case letters, to remove non alpha-numeric characters including all punctuation marks (including, for example, space characters, apostrophes, quote marks, full stops and the like), and to expand abbreviations (for example, expanding "ST" at the end of an input term to "STREET", expanding "RD" to "ROAD", expanding "N" to "North", "W" to "WEST" and so on).

If the input term includes an ambiguous abbreviation the processor splits the term into two terms, one in the abbreviated form and one in the expanded form. Splitting a term into two can avoid not matching a input data string with a postal address element, where the postal address element concerned contains a letter that is not in fact an abbreviation (for example, there may be premises known as "The Big W"). If the term is not ambiguous, the processor may not split the input term into two (for example it may be assumed that "RD" is an unambiguous abbreviation for "ROAD"). Also, if the input data term starts with a number, that number is removed from the beginning of the data term and sent to the end. Moving numbers to the end of data strings facilitates better searching of the dictionary, where numbers are also represented at the end of the entries. The dictionary 4 is also formed in such a way that all premise numbers are excluded from the dictionary to facilitate more efficient searching. Again, if the input data term includes a number the processor may search for entries in the dictionary corresponding either to the data term with the number moved to the end and also the data term with the number removed.

The input data terms may also be accompanied with data specifying the postal address element type to be searched in relation to that given data term. For example, the user may specify that one of the data terms entered is a postal code; the processor during the subsequent searching then being able to ignore matching data of a different type.

If the processor 2 were instructed to search for an entry in the dictionary identical the input term "TOW¶" the processor would start at the root node 10, find the first letter "T" of "TOW" pointing (pointer 15c) to node 12c where the letter "O" would be found, which in turn is associated with a pointer 15b pointing to node 13c where the letter "W" would be found, which is associated with a pointer 15d pointing to node 11c, a leaf node. The leaf node is, in this case, an end of string character ("¶"), because in the dictionary illustrated there are no other entries sharing the stem "TOW". The leaf node 11c points (pointer 15e) to a position in the location index 5 where data concerning the occurrences in the coded postal address data store 6 corresponding to "TOW" (the entry found in the dictionary) is provided. There may of course be more than one such occurrence in the data store 6.

If an input data term 8 does not correspond exactly with an entry in the dictionary 4, the processor 2 will search the dictionary again allowing for one error. A single error, for the present purpose, is counted as a substitution of a character, a deletion of a character or an addition of a character. Allowing for one such error, given the input data term 8 "TOW", would, in respect of the dictionary illustrated in FIG. 2, yield the results "BOW", "STOW" and "TO", in addition to "TOW". In the case of "BOW" the letter "T" has been substituted with the letter "B", in the case of "STOW" the letter "S" is added and in the case of "TO" the letter "W" has been deleted. (It will be noted that node 13c contains other characters, as well as an end of string character because there are, in addition to the word "TO", other words sharing the stem "TO" such as, for example, "TOW". The node 13c therefore effectively acts, in part, as a leaf node. The processor 2 if unsuccessful in finding a postal address corresponding to the input terms 8 may allow for more errors in one or more of the input terms. If one input term 8 is matched without error, it is assumed that such an input term 8 is correct, unless, that is, it becomes apparent to either the processor 2 or the user that the input term is not correct. For most situations, assuming that an exactly matched input term is correct saves time on searching for close, but not exact matches, that would otherwise turn out to be irrelevant.

Figure 4A:
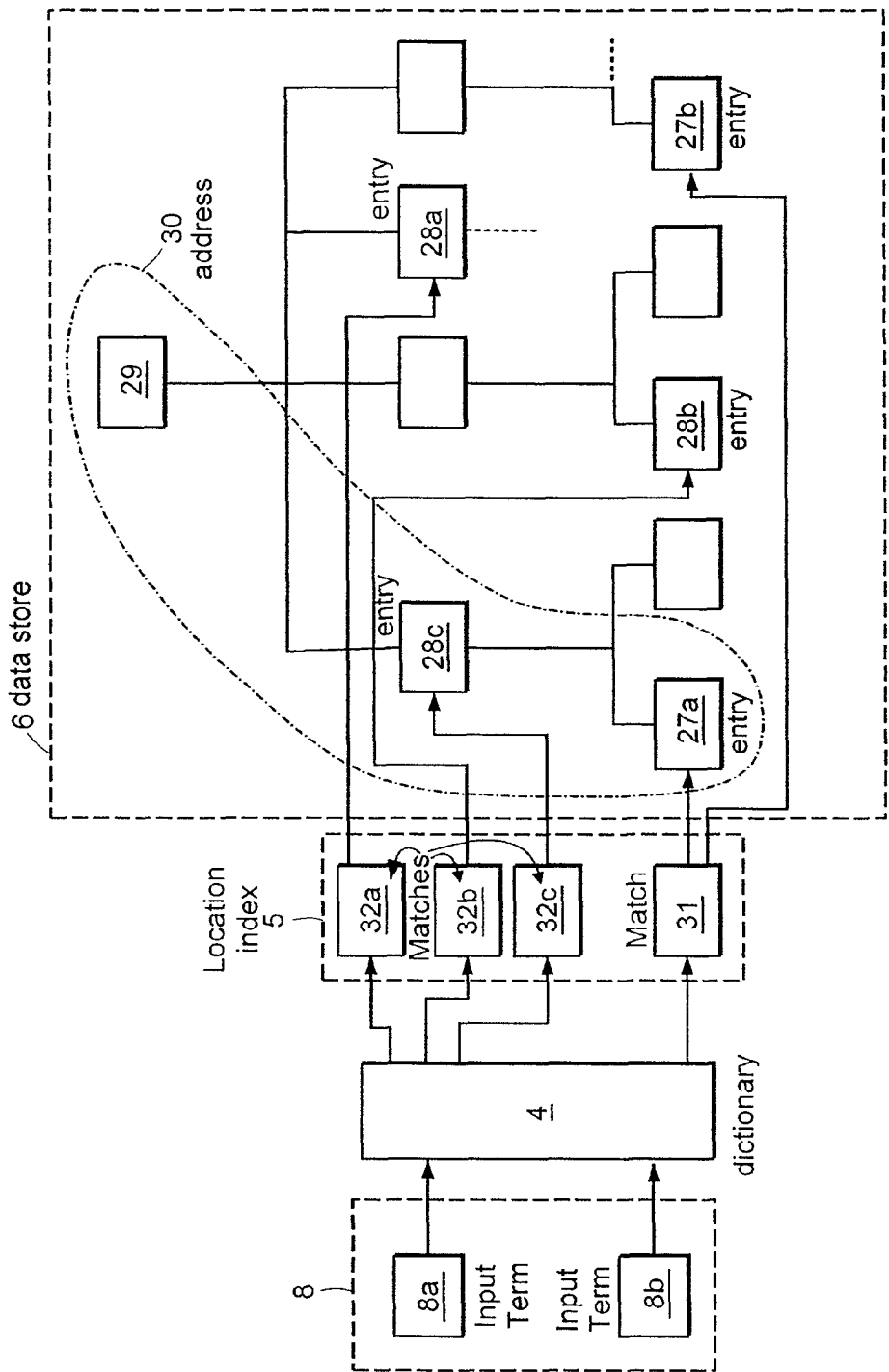
FIG. 4a is a schematic diagram illustrating the operation of the system in one embodiment of the invention to search for an address.
Figure 4B:
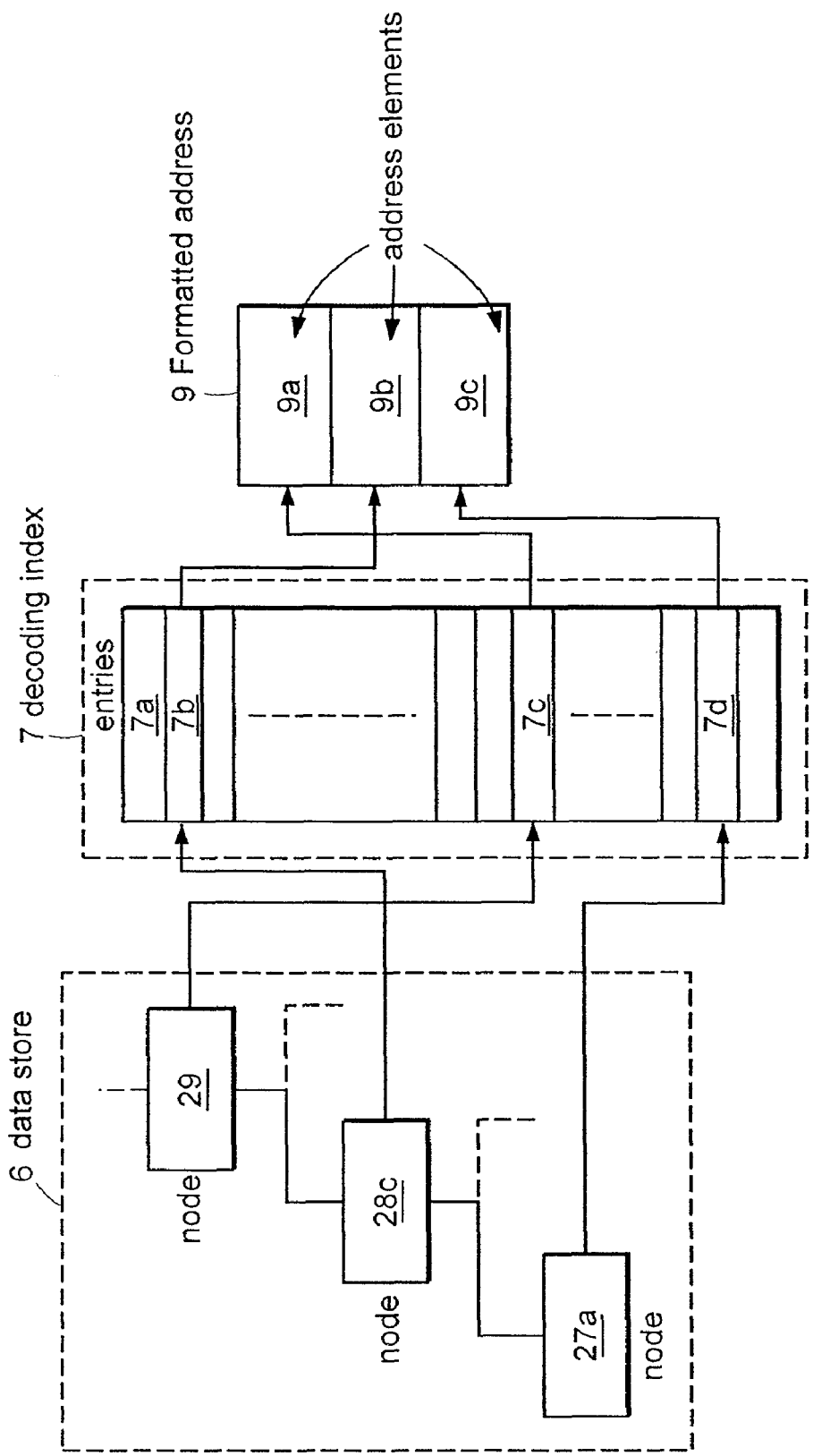

FIGS. 4a and 4b illustrate, with schematic diagrams, a search for an address 30 within the coded postal address data store 6. As shown in FIG. 4a two input terms 8a, 8b are inputted by the processor (not shown in FIG. 4a) and are then searched in the dictionary 4. The results from the search of the dictionary 4 include a match 31 identical to term 8b but no matches identical to term 8a. The processor 2 then searches the dictionary 4 again for entries corresponding to term 8a but allowing for one error (any of a deletion, addition or substitution). That search reveals three matches 32a, 32b and 32c. The processor then ascertains via the location index 5 the locations of the entries in the coded postal address data store 6 corresponding to the matches found. As shown in FIG. 4a, two entries 27a and 27b in the data store 6 are found relating to dictionary entry 31 and there are three entries 28a, 28b, 28c in the data store 6, each one corresponding to one of the three dictionary entries 32a, 32b and 32c. From the location data in the data store 6 the processor is able to ascertain that the entries 27a and 28c in data store 6 corresponding to dictionary entries 31 and 32c are located within a group of data representing address 30. The processor then decides that this is the address corresponding to the input terms 8a and 8b. With reference to FIG. 4b the processor then decodes the codes in the nodes 29, 28c, 27a relating to the address 30 held in the data store 6 with reference to the postal address element decoding index 7. The decoding index 7 includes entries 7a, 7b, 7c, 7d enabling the processor to ascertain the full postal address element represented by a given code. The processor is thus able to output the full and correctly formatted address 9, comprising address elements 9a, 9b, 9c corresponding to the nodes in the coded address store 6.

As mentioned above, it will be appreciated, that there are many ways in which the present invention may be implemented provided that the underlying structure of the computer program product, computer software, and/or data is in accordance with the principles as set forth above. It will also be understood that the invention is not limited to the embodiment described above with reference to the drawings, but is capable of numerous rearrangements, substitutions and modifications without departing from the spirit of the invention. Such alternatives will be readily apparent to those skilled in the art and are encompassed within the spirit of the invention and the scope of the claims appended hereto.

For example, the dictionary entries and the pre-processing performed on input terms may differ from country to country. For example in some countries, it is common for numbers to form a part of the address in addition to premise numbers and may need to be treated differently. In other countries, non-alphanumeric characters may also have greater significance than countries such as the UK where those characters may effectively be ignored when searching the dictionary.

What is claimed is:

1. A computerized method of populating a software application with a formatted address of an individual, the method comprising:

providing a data structure in a computer readable storage medium having a plurality of postal address elements selectively associated with a plurality of postal addresses such that each postal address is associated with a subset of the postal address elements that collectively indicate the respective postal address, wherein the postal address elements include at least postal code elements and house number elements;

receiving, via a keyboard of a computing device operated by a user, a postal code indicating a numeric or alphanumeric postal code associated with an individual;

identifying in the data structure a plurality of postal addresses associated with postal code elements matching the received postal code associated with the individual;

receiving, via the keyboard of the computing device operated by the user, a house number indicating a numeric and/or alphanumeric house number associated with the individual;

identifying in the data structure a single postal address of the identified plurality of postal addresses that is associated with a house number element matching the received house number; and pasting the postal address elements associated with the single postal address into a user interface of a separate software application running on the computing device so that the single postal address is usable in the separate software application.

2. The computerized method of claim 1, further comprising:

displaying the identified plurality of postal addresses on a display of the computing device.

3. The computerized method of claim 1, further comprising:

displaying the identified single postal address on a display of the computing device and performing the pasting in response to receiving an authorization input from the user indicating that the displayed single address is the address of the individual.

4. The computerized method of claim 1, wherein the postal code element associated with the single postal address that is pasted into the user interface of the separate software application is formatted differently than the received postal code.

5. A computerized method comprising:

accessing, by a computing device, a data structure having a plurality of postal address elements selectively associated with a plurality of postal addresses such that each postal address is associated with a subset of the postal address elements that collectively indicate the respective postal address;

receiving, by the computing device, location information regarding an individual, the location information indicating one or more of (i) a city, (ii) a state, or (ii) a postal code;

identifying in the data structure a plurality of postal addresses associated with location elements matching the received location information;

receiving, by the computing device, at least a portion of a building number;

identifying in the data structure a matching postal address of the identified plurality of postal addresses that is associated with a building number element matching the received building number; and providing postal address elements associated with the matching postal address to a user interface of a separate software application so that the matching postal address is usable in the separate software application.

6. A tangible computer-readable medium having instructions stored thereon, the instructions executable by a computing device in order to cause the computing device to perform operations comprising:

accessing a data structure having a plurality of postal address elements selectively associated with a plurality of postal addresses such that each postal address is associated with a subset of the postal address elements that collectively indicate the respective postal address;

receiving location information regarding an individual, the location information indicating at least a portion of one or more of a city, a state, or a postal code;

receiving at least a portion of a building number associated with the individual;

identifying a postal address in the data structure that is associated with a location element substantially matching the received location information and is associated with a building number element substantially matching the received building number; and providing postal address elements associated with the identified postal address to a separate software application so that the identified postal address is usable in the separate software application.

7. The computer-readable medium of claim 6, wherein the data structure is stored on the computer readable medium.

8. The computer-readable medium of claim 6, wherein the data structure is accessed via one or more network connections.

9. The computer-readable medium of claim 6, wherein the data structure is organized in a tree structure.

10. The computer-readable medium of claim 6, wherein said identifying comprises searching the data structure for an exact match between a location element and the received location information and then, if an exact match is not located, searching the data structure for a close match between the location element and the received location information.

11. The computer-readable medium of claim 10, wherein close matches are identified by determining that Levenshtein distances between respective location elements and the received location meet a threshold.

12. The computer-readable medium of claim 6, wherein said identifying comprises searching the data structure for an exact match between a building number element and the received building number and then, if an exact match is not located, searching the data structure for a close match between the building number element and the received building number.

13. The computer-readable medium of claim 10, wherein close matches are identified by determining that Levenshtein distances between respective building number elements and the received building number meet a threshold.

14. The computer-readable medium of claim 10, wherein the operations further comprise:

providing for display in a user interface at least portions of a plurality of postal addresses having location elements substantially matching the received location information.

15. A computing system comprising:

a processor configured to execute software instructions;

a computer readable medium storing software instructions configured for execution by the processor in order to cause the computing system to perform operations comprising:

accessing a data structure having a plurality of postal address elements selectively associated with a plurality of postal addresses such that each postal address is associated with a subset of the postal address elements that collectively indicate the respective postal address;

receiving location information regarding an individual indicating a location comprising a plurality of addresses;

receiving additional address information associated with the individual;

identifying an address in the data structure that is associated with a location element substantially matching the received location information and is associated with a data element substantially matching the additional address information; and providing address elements associated with the identified address to a separate software application so that the identified address is usable in the separate software application, or storing the address elements associated with the identified address in a particular storage area.

\* \* \* \* \*